United States Patent
Angenendt et al.

(10) Patent No.: US 9,193,912 B2
(45) Date of Patent: Nov. 24, 2015

(54) THERMALLY INSULATING FIRE-PROTECTION MOLDING AND PROCESS FOR PRODUCING SAME

(75) Inventors: Rainer Angenendt, Xanten (DE); Peer Genth, Rangsdorf (DE); Heike Meschke, Kevelaer (DE)

(73) Assignee: TDH—GMBH TECHNISCHER DAEMMSTOFFHANDEL, Hamburg (DE)

(*) Notice: Subject to any disclaimer, the term of this patent is extended or adjusted under 35 U.S.C. 154(b) by 252 days.

(21) Appl. No.: 13/820,334

(22) PCT Filed: Sep. 1, 2011

(86) PCT No.: PCT/EP2011/004407
§ 371 (c)(1),
(2), (4) Date: Apr. 30, 2013

(87) PCT Pub. No.: WO2012/031717
PCT Pub. Date: Mar. 15, 2012

(65) Prior Publication Data
US 2014/0145104 A1  May 29, 2014

(30) Foreign Application Priority Data

Sep. 6, 2010 (DE) .................... 10 2010 044 466

(51) Int. Cl.
| | | |
|---|---|---|
| C04B 28/00 | (2006.01) |
| C04B 28/24 | (2006.01) |
| C04B 26/06 | (2006.01) |
| C04B 20/10 | (2006.01) |
| C09K 21/14 | (2006.01) |
| B29C 35/00 | (2006.01) |
| E04B 1/94 | (2006.01) |
| C04B 111/28 | (2006.01) |

(52) U.S. Cl.
CPC .............. *C09K 21/14* (2013.01); *B29C 35/00* (2013.01); *C04B 20/1033* (2013.01); *C04B 20/1051* (2013.01); *C04B 26/06* (2013.01); *C04B 28/003* (2013.01); *C04B 28/24* (2013.01); *E04B 1/941* (2013.01); *C04B 2111/28* (2013.01)

(58) Field of Classification Search
USPC ................ 252/62; 106/38.35, 711, 802, 672; 264/323; 524/493
See application file for complete search history.

(56) References Cited

U.S. PATENT DOCUMENTS 6,987,076 B1   1/2006  Jubb et al.
8,968,464 B2 *  3/2015  Angenendt et al. ........... 106/708

FOREIGN PATENT DOCUMENTS

| EP | 0829459 | 3/1998 |
| EP | 1201703 | 5/2002 |
| EP | 1484292 | * 12/2004 |
| EP | 1484294 | 12/2004 |
| EP | 1591598 | 11/2005 |
| EP | 1992597 | 11/2008 |
| GB | 2341607 | 3/2000 |
| WO | 2011104005 | 9/2011 |
| WO | 2011104006 | 9/2011 |

* cited by examiner

Primary Examiner — Carol M Koslow
(74) Attorney, Agent, or Firm — Lucas & Mercanti, LLP; Jonathan Myers

(57) ABSTRACT

The thermally insulating fire-protection molding is characterized in that it contains at least one lightweight filler, one reaction product of the thermal curing of an organic-inorganic hybrid binder, one mineral that eliminates water, and also fibers and/or wollastonite, and is impermeable to smoke.

12 Claims, 1 Drawing Sheet

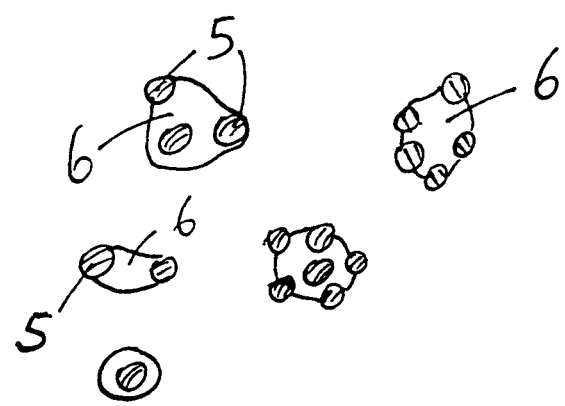

THERMALLY INSULATING FIRE-PROTECTION MOLDING AND PROCESS FOR PRODUCING SAME

CROSS REFERENCE TO RELATED APPLICATIONS

This application is the US National Phase of PCT/EP2011/004407 filed 1 Sep. 2011, published 15 Mar. 2012 as WO 2012/031717 A1, and claiming the priority of German Patent Application DE 10 2010 044 466.9 filed 6 Sep. 2010, whose entire disclosures are herewith incorporated by reference.

FIELD OF THE INVENTION

The invention relates to a thermally insulating fire-protection molding, particularly a fire-protection slab.

BACKGROUND OF THE INVENTION

The term lightweight fillers presently refers to high-fusing, mineral particularly closed-cell, hollow spheres and granules of low density, for example hollow spheres of glass, swelled volcanic ash, expanded perlite, etc.

PRIOR ART

Fire-protection slabs that are commercially available and sold under the trade name "Knauf THERMAX" are known in the art; they contain expanded vermiculite, which is a three-layer silicate as well as purely inorganic binding agents, but no fibers. They have a density (volumetric weight) of ca. 475 to 850 kg/m$^3$.

Also known in the art are purely inorganic fire-protection slabs that are made of glass-fiber reinforced lightweight concrete and distributed under the trade name "AESTUVER T" having a density (volumetric weight) of ca. 690 to 980 kg/m$^3$.

Background on Structural Fire Protection

Related structural measures, for example in buildings, are very varied ranging from used building materials to structural parts, regulated in Germany according to DIN 4102 and ENV 1992-1-2, and from constructional fire protection in industrial buildings, regulated according to DIN 18230, via escape route planning to fire-fighting systems in buildings. In Austria, this is regulated by various TRVB-B guidelines.

In Germany, any larger construction must be inspected by a licensed fire-protection expert who drafts a fire-protection approval certificate. Moreover, any concept design for protecting against fire must be coordinated with the competent local authorities. A federal law delegates competence to the regional government level (Land). Regulations differ therefore from one federal regional state to another (Bundesland).

In Austria, the fire-prevention authorities oversee fire-policing inspections (also under the sovereignty of the individual federal regional states). In Switzerland, regulation is handled on the cantonal level.

In particular, building projects must take into account the following aspects
  Fire behavior of building materials
  Fire resistance of components
  Division of the building into fire sections by means of fire walls and protective fire doors
  Escape route planning
  Active fire fighting by means of sprinkler systems
  Specifically the increasing penetration of large buildings with energy supply, control and data lines runs counter to regulatory calls for separating buildings into fire sections by means of fire walls and fire-resistant floor ceilings. This is the reason why special fire-protection facilities, such as fire detection systems, emergency illumination, fire protection gates and doors are maintained intact for as long as possible in modern buildings that typically house larger congregations of people (for example, railway stations, airports, museums, convention centers, etc.).

In Germany, the use of halogen-free (no PVC) power lines is standard in public buildings. Power lines that extend through several fire sections must be secured by a fire bulkhead. Electrical lines used for mechanical de-smoking or a fire detection system must be able to resist fire (while preserving function) at a rating of E90 or E30, depending on the related application.

Buildings that are used by or for people with movement restrictions should also not be forgotten (such as hospitals, clinics, retirement homes, assisted living facilities, etc.).

Structural fire protection has gained special attention in tunnel construction in the aftermath of dramatic tunnel fires that have occurred over the past few years. Aside from compliance with the construction rules, computational proof (the so-called "hot rating") has increasingly gained in importance. Regulations regarding computational proof can be found, for example, in ENV 1992-1-2, ZTV-Ing and the Guideline for Fire and Disaster Protection (Richtlinie fur den Brand- und Katastrophenschutz) by the German Railroad (Deutsche Bahn).

OBJECT OF THE INVENTION

Object and Solution of the Invention

The object of the present invention seeks to provide extremely light, stable and sufficiently flexible fire-protection moldings with high resistance against the impact of fire of the type as set forth in the introduction and having a density of less than 0.3 g/cm$^3$ (corresponding to 300 kg/m$^3$), as well as a melting point pursuant to DIN 4102 of greater than 1000° C. and not showing any external or internal cracks or disintegration of any kind below that temperature, plus demonstrating, additionally, very low heat conductivity.

SUMMARY OF THE INVENTION

According to the invention, the object is achieved with a thermally insulating fire protection molding of the type as mentioned in the introduction in that the same contains at least one lightweight filler (preferably having a bulk density below 200 kg/m$^3$), one reaction product of the thermal curing of an organic-inorganic hybrid binders, one mineral that eliminates water, as well as fibers and/or wollastonite, and that is impermeable to smoke.

The term hybrid binder therein, denotes a binder having inorganic as well as organic components. Detailed explanations are set forth below under the sub-heading "hybrid binders used according to the invention."

The binding agents in the present patent application are "hybrid binders" that achieve, on the one hand, the necessary elasticity for the applications according to the invention by means of the organic component, and wherein, on the other hand, in case of a fire, the inorganic component keeps the composite intact.

In the event of a fire, any organic components of the hybrid binder are thermally degraded at temperatures above 160° C. to 400° C. The binding agents become brittle but maintain their binding action due to the inorganic component thereof.

Preferably, the used hybrid binder contains fine particles that in turn are composed of amorphous silicic acid particles (5) containing an acrylate-based polymer (6) as a binding agent, particularly n-butyl acrylate and methyl methacrylate and/or latex.

According to the invention, the combination of hybrid binder and water-eliminating mineral is Important. With a correspondingly high proportion, the hybrid binder allows for a high level of solidity and flexibility of the fire-protection molding, while still maintaining a light weight. The flammability of the organic component of the hybrid binder is suppressed by the water-eliminating mineral, which releases water at elevated temperatures, thereby quasi functioning as an extinguishing agent. To this end, it is ensured according to the invention that the release of the crystal water occurs in the same temperature range as the thermal degradation. By combining the hybrid binder and water-eliminating mineral it is surprisingly possible to achieve an extremely low density that is coupled, nevertheless, with good fire resistance. Particularly, the mineral that eliminates water prevents any ignition of smoke gases in the event of a fire.

Experiments in the small test furnace facility at the technical inspection society TÜV Nord have shown that fire-protection slabs according to the invention having only a thickness of 18 mm and a density of 0.125 g/l were able withstand fire for over 30 minutes.

Furthermore, it is ensured that the material does not shrink by burning off the organic components, nor due to the release of the crystal water, nor do cracks form, nor does the material become unstable.

Particularly innovative therein is the fact that the inorganic residues of the hybrid binder and the water-eliminating mineral granules and filler materials supplement each other in such a way during a fire and the related increase in temperature that they have a solidifying effect, and a shape-retaining fire-protection slab is thus preserved intact.

There exists no comparable insulating material that fulfills the properties of a fire-protection slab in the same way as the thermally insulating fire-protection slabs according to the invention.

The moldings according to the invention are solid up to temperatures of 1000° C. such that fire-protection slabs of a strength of approximately 18 mm provide the required fire resistance according to standard conditions.

Preferably, the hybrid binder and water-eliminating mineral quantities and/or components are harmonized with each other such that compliance with the required fire-protection class is provided.

In principle, the geometry of the moldings is not subject to any limitations. Moldings with complex geometries can be produced as well.

The thermally insulating, fire-protection molding according to the present invention is preferably configured as a thermal insulation slab, a fire-protection slab, normstein or masonry brick.

A special note is made in the context of the present patent application in that the same expressly deals with moldings for fire-protection such as, for example, fire-protection slabs. The same must be impermeable to smoke and be, correspondingly, resistant to heat convection as well.

Stones, pipes, hollow bodies and other moldings can also be manufactured in the same way as predominantly slabs. The density of 0.1 to 0.3 g/cm$^3$ is visibly below the bulk densities of known smoke-impermeable fire-protection slabs (to ensure fire protection, mineral fiber slabs always require a stable cover layer that is impermeable for smoke and fire). The heat conductivity of approximately 0.04 W/mk at 10° C. is also substantially better, because it is indeed considerably lower than in known fire-protection slabs.

The starting point for manufacturing is an aqueous mass; slabs are formed by known shaping methods, followed by drying and thermal post-treatment at approximately 110° C. For example, expedient shaping methods are as follows:

Vibration presses with low applied load;
Isostatic pressing;
Manual or mechanical pounding and/or ramming for complex shapes or smaller numbers of parts to be manufactured;
Extrusion methods;
Slip casting, particularly for special parts but also larger blocks, wherein the water content of mass produced for slip casting is higher by ca. 5 to 15% and the same contains a thickening agent;
Rollers.

Before drying it is recommendable to undertake careful and, in as much as possible, complete temperature control measures relative to the drying temperature in order to avoid drying cracks or errors. Drying can occur at room temperature or at temperatures up to 70° C. Short post-drying at ca. 110° C. increases hydrophobia.

The organic components of the hybrid binder are thermally degraded in the event of a fire that reaches temperatures above 160° C. to 400° C. The binding agents become brittle, however, still maintaining their binding action due to the inorganic component. Simultaneously, due to the water elimination from the mineral filler materials, ignition (burning off) of short-term generated smoke gases is prevented. Experiments in the small test furnace facility at TÜV Nord have demonstrated that fire-protection slabs having a thickness of only 18 mm and a density of 0.125 g/l are able to withstand fire for over 30 minutes.

Properties and Preparation of the Plastic Mass Serving as Starting Material for the Manufacture of the Thermally Insulating Fire-Protection slab Swelled cellular volcanic rock in the form of non-porous hollow granules and/or glass hollow spheres is/are used as lightweight filler. With the use of porous hollow granules, on the other hand, bulk density would increase, whereby more adhesive and minerals would be needed, the masses would be duller and therefore more difficult to process, with the porosity of the end product being considerably higher.

Hybrid binders are used as binding agents that have a basic structure which is inorganic. This results in a reduction of the fire load, with the binding action being maintained at high temperatures, even though with other properties. Since these binding agents have almost no shrinkage during burn-off the shape of the fire-protection moldings shows no substantial dimensional changes.

According to the invention, the mass is extremely stable after it has hardened and demonstrates, even with exposure to unilateral temperature stresses of 1000° C., virtually no shrinkage, no outer or inner crack formation and no crumbling. However, due to the contained organic components of the hybrid binder and water-eliminating materials, the application temperature is only at 150° C.; above this temperature, certain properties such as hydrophobia, resistance to vibration and flexibility are lost. The innovation of the product according to the invention lies specifically in the fact that suitable hybrid binder systems and water-eliminating minerals adjusted therein are used that provide sufficient cross-linking of the support construction made of fibers and mineral fillers with the lightweight fillers (swelled volcanic rock and/or glass hollow spheres) even before drying at room temperature, this providing the moldings, due to the organic component, with the necessary solidity, vibration stability and flexibility for further processing and application. The fibers may be a uniform type of fiber or a mixture of different fibers, particularly carbon fibers or mineral fibers, having a softening temperature of 500° C. or above, and/or mineral needles. The inorganic component of the hybrid binder maintains the binding action even above the burn-off of the organic component; thereby preventing shrinking and/or cracks from forming in the fire-protection slab.

Preferably in the process for preparing the thermally insulating fire-protecting molding, the plastic mass comprises:

| | |
|---|---|
| Lightweight filler | 20 to 35 weight % |
| Hybrid binder | 5 to 15 weight % |
| Fibers | 0.5 to 5 weight % |
| Siliceous earth mineral filler | 0 to 5 weight % |
| Aluminum trihydrate mineral filler | 2 to 7 weight % |
| Wollastonite | 0 to 15 weight % |
| Remainder | water, | wherein the siliceous earth contains fine silicic acid-kaolinite particles having a surface that is coated with a cross-linking agent silane.

The special innovative aspect therein lies in the fact that the inorganic residues of the hybrid binder and the water-eliminating mineral granules and fillers complement each other in the event of a fire and the ensuing temperature increase in such a way that they act in a solidifying manner, whereby a shape-retaining fire-protection slab is maintained.

One central aspect of utility for customers, when using the products according to the invention, lies the fact that, aside from the desired goal of efficient lightweight construction with fire protection, it is possible to achieve significant cost savings on the customer side in terms of opportunity costs. Operating expenditures are lowered particularly in cabin construction on ships, but also relative to fire-safe furniture construction on trains, etc.

Lowering these costs is achieved for the most part by reducing the fire load and the weight, as well as by increasing the fire protection for customers.

Further important advantages of products according to the invention are as follows:
Now flammable
Lightweight
High temperature resistance
Low heat conductivity
Good strength properties
Easy assembly and processing
Many possible combinations
Low smoke gas generation
No odor generation
Non-hygroscopic
Hydrophobic
Water-conducting (lotus effect)
Resistance to chemicals
Good electrical insulation properties
Recycleble
Land fill-safe Lightweight Fillers used According to the invention In the Earth Sciences, perlite denotes an altered (chemically and physically converted) volcanic glass (obsidian) and is therefore considered a type of rock. The previously referred to perlitic structure is constituted of approximately pea-sized glass spheres. Perlite contains up to 2% water and has a density of approximately 900 to 1000 kg/m$^3$ (bulk density of bulk perlite). By annealing to ca. 800° C. to 1000° C., perlite swells in volume to fifteen to twenty times the original volume, wherein it has a bulk density of 50 to 100 kg/m$^3$ and heat conductivity of $\lambda$=0,040 to 0,070 W/mK.

According to the invention, these perlites are not usable because of the porosity thereof.

On the other hand, the invention provides for the expedient use of microcellular-level expanded volcanic rock and glass hollow spheres. Microcellular-level expanded volcanic rocks produced in adherence to environmentally friendly and energy saving methods achieve properties and technical values that distinguish the same from older, porously expanded volcanic rock ("expanded perlites"). Microcellular-level, expanded volcanic rock is a filler material from the group of aluminum silicates constituted of spherical ("honeycomb structure"), bar-shaped and flaky particles, thus resulting in high packing densities and higher composite toughness than in conventional micro-hollow spheres, due to mechanical and cohesive binding properties. Targeted surface coatings allow for advantageous bonding with the inorganic and/or organic matrix. The results are less shrinkage and better technical properties. Expanded impregnated perlite is commercially available, for example, under the trade names NOBLITE® (product by the company NOBLITE, Route de Claye, F-77181 LE PIN, France) and Technoperl® (product of Europerl Germany, D-94032 Passau, Nibelungenplatz 4).

The combination or sole use of micro-glass hollow spheres has proved useful in achieving especially low bulk densities such as, for example, offered by manufacturer 3M.

Fibers Used According to the Invention

Used, in particular, are organic fibers, for example, carbon fibers and/or mineral fibers and/or mineral needles.

Hybrid Binders Used According to the Invention

The use of an organic-inorganic hybrid binder is preferred; the same is available under the trade name COL.9 from the company BASF, and/or Levasil 4063 by the company Obermeier. Both products contain amorphous silicic acid particles and polymers on the basis of n-butyl acrylate and methyl methacrylate or latex (see FIG. 1). The particles are dispersed in water. Due to the stickiness of the particles based on the polymer content, an excellent binder for low temperatures, approximately to 200° C., is obtained. At increased temperatures, the polymer component degrades and the silicic acid particles are left behind, whereby the structure is maintained, and wherein the silicic acid particles also constitute a solid structure at a correspondingly high temperature. Therefore, shrinkage does not occur at low or at elevated temperatures. The binding agents have a solid content of approximately 35 to 60 weight %. The silicate component relative to the solid content is 30 to 50 weight % or 75 to 95 weight %, respectively.

Water-Eliminating Mineral Fillers Used According to the Invention

The water-eliminating mineral filler can be aluminum trihydrate and the use of surface-treated aluminum trihydrate is preferred; for example, Trefil 744-300 EST and/or Trefil 744-300 MST from the company Quarzwerke GmbH. In addition, a surface-treated siliceous earth is used as well. Siliceous earth is understood to mean a close blend of small-particle silicic acid and kaolinite. Known in the art is, for example, Neuburg siliceous earth, which is preferred according to the invention. To improve wettability with water, the siliceous earth is treated with a silane, such that individual particles receive a functional hydrophilic surface.

Such activated siliceous earth is commercially available under the trade name "AKTISIL EM" from the company Hoffmann Mineral GmbH, Neuhurg (Danube). In this product, siliceous earth is treated with 3-epoxypropyl-oxy-propyl-trimethoxy silane. Activated siliceous earth as referred to above can be used in powdered form. However, the use of a mixture of silica sol and kaolin/kaolinite is also possible according to the invention.

Preparation Examples and Exemplary Production Parameters

All liquid components of the formula are precisely weighed in and carefully mixed, while avoiding foam from forming. In practice, simple toothed disc agitators have proved useful for this purpose.

The precisely weighed fibers are added evenly, in small unit portions to this mixture; by stirring (at a low speed) they are plucked apart and completely wetted with the aqueous solution (knotting must be avoided).

The precisely weighed lightweight fillers and minerals are then mixed in a tumbler-type mixer. Afterwards the mixture is fed, stirring evenly, into a horizontal pan-type mixer (for example, by the company BEBA). Both premixes are blended over the course of approximately 25 minutes, while stirring with even slowness. High shearing forces, pressure and friction must be avoid as much as possible to avoid damaging the microcellular swelled volcanic rocks.

The lightweight fillers should be completely wetted and result in a mortar of even looseness or a plastic mass, respectively.

Production Parameters 1 for 100 kg Plastic Mass for Moldings Having a Bulk Density of Ca. 0.125 g/l

| | |
|---|---|
| Water | 55.7 kg |
| Mineral wool (e.g., Rockwool Loose Wool) | 3.0 kg |
| Carbon fibers | 0.3 kg |
| Hybrid binder (COL 9 by BASF/Levasil 4063 by Obermeier) | 11.0 kg |
| Light glass-type hollow spheres (K1/K15 by 3M) | 22.0 kg |
| Siliceous earth (e.g., Aktisil EM by Hoffman-Minerals) | 2.0 kg |
| Aluminum trihydrate | 4.0 kg |
| Surface-active solution 2% (e.g., Tegopren 5840 by Evonik) | 2.0 kg |

Production Parameters 2 for 100 kg Plastic Mass for Moldings having a Density of ca. 0.3 g/l

| | |
|---|---|
| Water | 47.00 kg |
| Wollastonite (e.g., Tremin 939-300 EST by Quarzwerke) | 6.50 kg |
| Hybrid binder (COL 9 by BASF/Levasil 4063 by Obermeier) | 6.50 kg |
| Water-resistantly equipped, swelled microcellular volcanic rocks (e.g., Noblite 100 EC and Noblite 200 EC by Noblite) | 32.00 kg |
| Siliceous earth (e.g., Aktisil EM by Hoffmann-Minerals) | 3.00 kg |
| Aluminum trihydrate | 4.00 kg |
| Surface-active solution 2% (e.g., Tegopren 5840 by Evonik) | 1.00 kg |

Preferred Fire-Protection Molding Compositions According to the Present Invention have the Following Ingredients:

| | |
|---|---|
| Lightweight filler | 45 to 75 weight % |
| Fibers | up to 15 weight % |
| Reaction product of the thermal curing of the organic-inorganic hybrid binder | 8 to 25 weight % |
| Wollastonite | up to 30 weight % |
| Water-eliminating minerals | 6 to 18 weight %. |

The invention claimed is:

1. A thermally insulating, fire-protection molding which comprises:
   (a) at least one lightweight filler,
   (b) at least one reaction product of the thermal curing of an organic-inorganic hybrid binder, which comprises fine, amorphous silicic acid particles and an acrylate polymer that is selected from the group consisting of n-butyl-acrylate, methyl-methacrylate, latex, and mixtures thereof,
   (c) aluminum trihydrate as at least one mineral filler that eliminates water, and
   (d) fibers and/or wollastonite, wherein said fire-protection molding is impermeable to smoke and retains its solid shape up to a temperature of 1000° C.

2. The fire-protection molding according to claim 1, wherein the lightweight filler has a bulk density of below 200 kg/m$^3$.

3. The fire-protection molding according to claim 1, wherein the fibers are a uniform type of fibers or a mixture of different fibers.

4. The fire-protection molding according to claim 3 wherein the fibers are a mixture of different carbon fibers or mineral fibers, having a softening temperature of 500° C. or above and/or mineral needles.

5. The fire-protection molding according to claim 1, which comprises:

| | |
|---|---|
| Lightweight filler | 45 to 75 weight % |
| Fibers | up to 15 weight % |
| Reaction product of the thermal curing of the organic-inorganic hybrid binder | 8 to 25 weight % |
| Wollastonite | up to 30 weight % |
| Water-eliminating minerals | 6 to 18 weight %. |

6. The fire protection molding as defined in claim 5 wherein the water-eliminating minerals in addition to aluminum trihydrate comprise siliceous earth particles surface-treated with a silane so that the siliceous particles receive a functional hydrophilic surface.

7. The fire-protection molding according to claim 1, configured as a thermal insulation slab, fire-protection slab or masonry brick.

8. A process for manufacturing a thermally insulating fire-protection molding as defined in claim 1, which comprises the steps of:
   a) shaping a plastic mass containing at least one said lightweight filler, the organic-inorganic hybrid binder, the aluminum trihydrate that eliminates water, and said fibers and/or wollastonite;
   b) drying the plastic mass at a temperature between room temperature and 70° C.; and
   c) thermally curing the plastic mass at a temperature of 110° C. to harden the plastic mass thereby forming a thermally insulating fire-protection molding.

9. The method as defined in claim 8,
   wherein swelled closed-cell volcanic rock, which is equipped with a surface water protection layer, and/or glass hollow spheres are used as the at least one lightweight filler, and
   wherein the mass further contains as the aluminum trihydrate, surface treated aluminum hydrate and further contains a mineral filler that eliminates water selected from surface treated siliceous earth, or a mixture of silica sol and kaolin/kaolinite where the siliceous earth is a mixture of kaolinite and fine particle silicic acid.

10. The method as defined in claim 9 wherein as the additional water-eliminating mineral filler, a siliceous earth is used that contains fine silicic acid-kaolinite particles the surface of which is coated by a silane so that the siliceous particles receive a functional hydrophilic surface.

11. The method according to claim 8 wherein a uniform type of fibers or a mixture of different fibers and/or mineral needles are used in the plastic mass.

12. The method according to claim 8 wherein the plastic mass comprises:

| | |
|---|---|
| Lightweight filler | 20 to 35 weight % |
| Hybrid binder | 5 to 15 weight % |
| Fibers | 0.5 to 5 weight % |
| Siliceous earth mineral filler | 0 to 5 weight % |
| Aluminum trihydrate mineral filler | 2 to 7 weight % |
| Wollastonite | 0 to 15 weight % |
| Remainder | water, | wherein the siliceous earth contains fine silicic acid-kaolinite particles having a surface that is coated with a silane.

* * * * *